Feb. 25, 1947.　　　P. SPURLINO ET AL　　　2,416,598
SORTING DEVICE
Filed Dec. 9, 1941　　　2 Sheets-Sheet 1
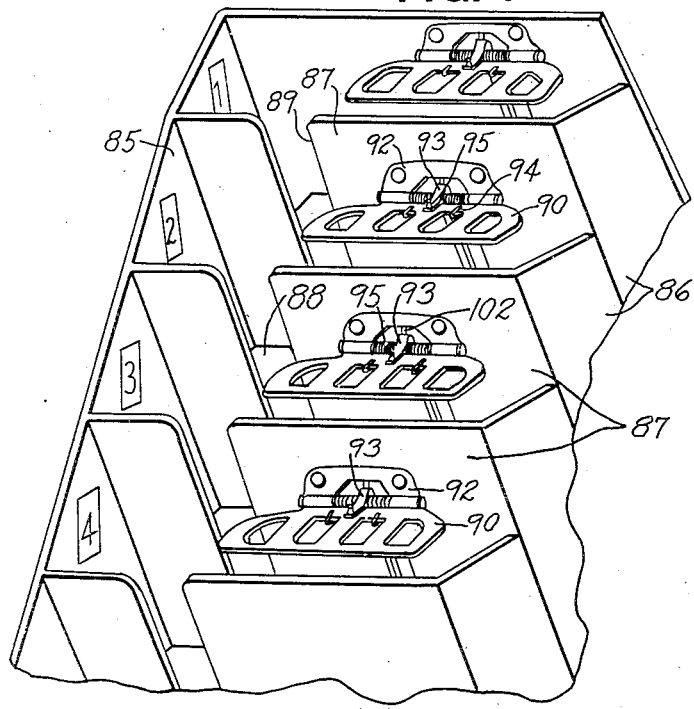
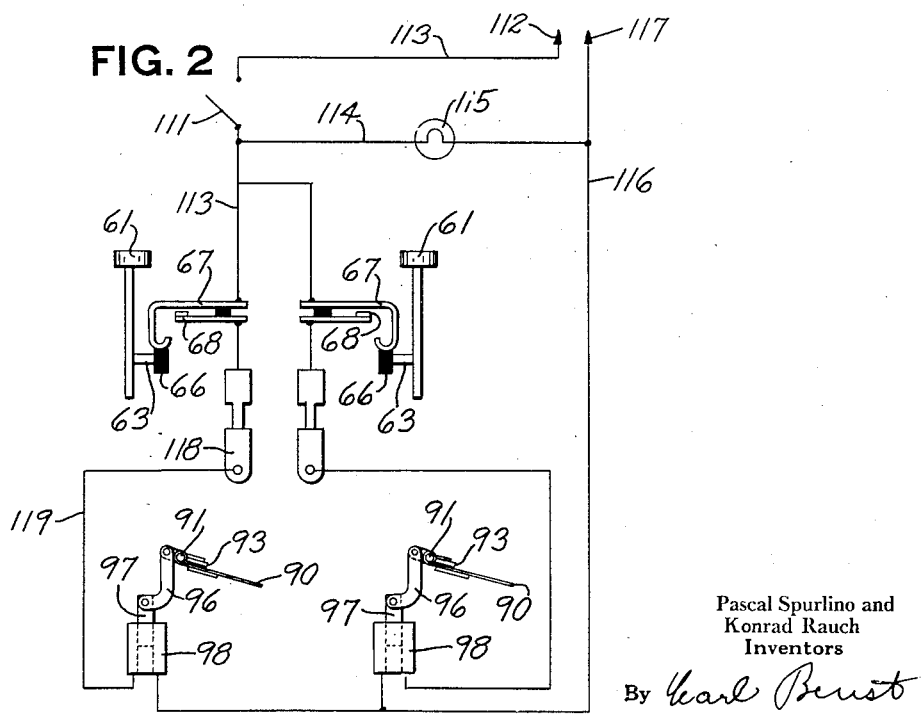
Pascal Spurlino and
Konrad Rauch
Inventors
By Karl Benst
Their Attorney

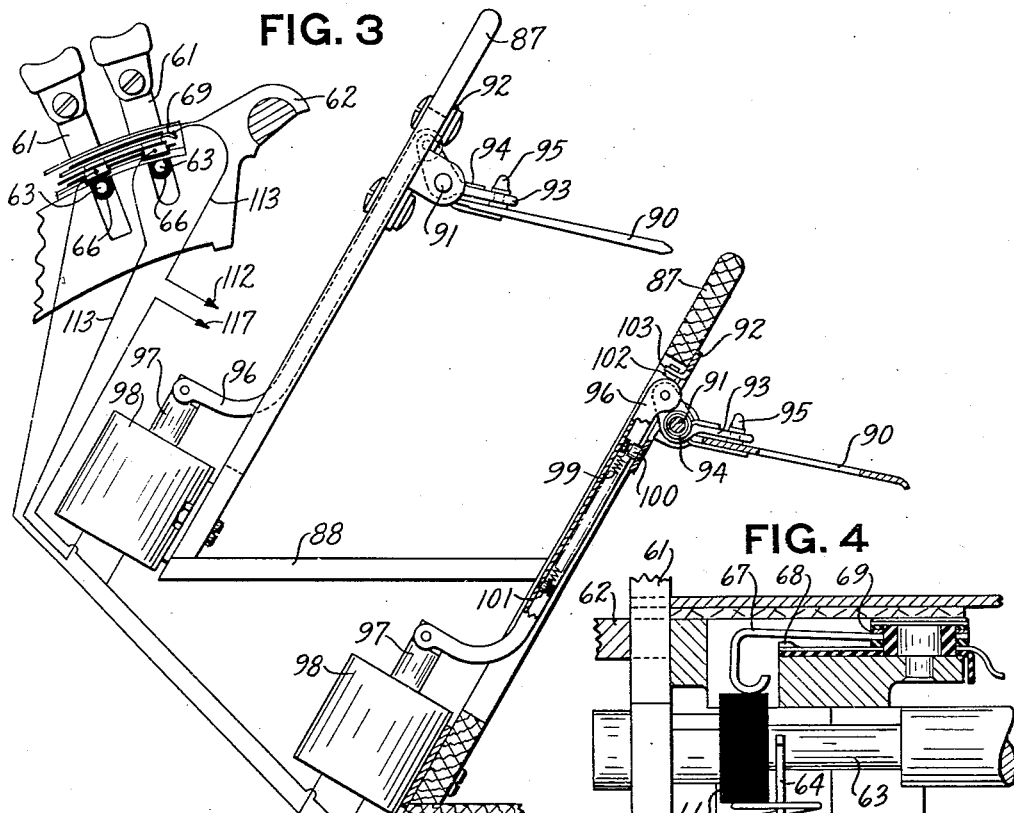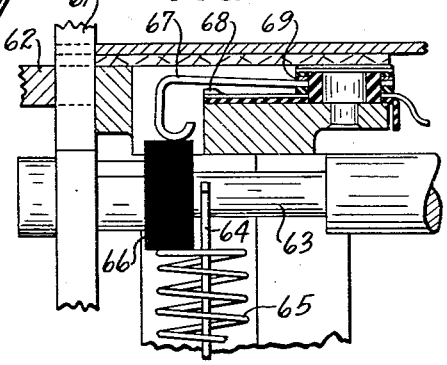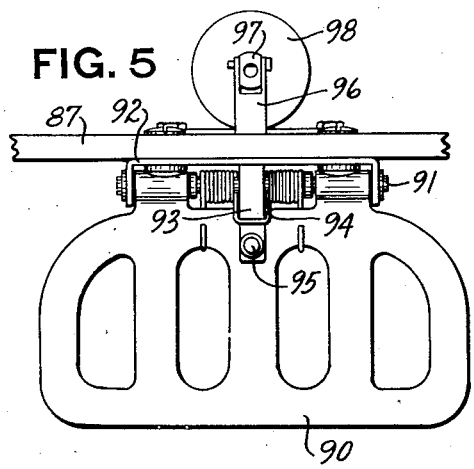

Patented Feb. 25, 1947

2,416,598

UNITED STATES PATENT OFFICE 2,416,598

SORTING DEVICE

Pascal Spurlino and Konrad Rauch, Dayton, Ohio, assignors to The National Cash Register Company, Dayton, Ohio, a corporation of Maryland Application December 9, 1941, Serial No. 422,276

9 Claims. (Cl. 177—333)

This invention relates to indicating means associated with record material sorting compartments and more particularly to such means which may be electrically operated and controlled from an accounting machine whereby a signal is given to the operator to indicate into which compartment the operator should place the record material relating to the particular transaction being recorded by the accounting machine.

The invention is shown embodied in an accounting machine of the type described in the application for United States Letters Patent of Mayo A. Goodbar, Serial No. 324,462, filed March 18, 1940, which application issued into United States Patent No. 2,305,000 on December 15, 1942, to which reference will herein be made for the disclosure of a complete accounting machine, including mechanisms which are not specifically described herein. Although the accompanying drawings show the invention used in connection with a machine of the general type disclosed in the above patent No. 2,305,000, it is manifest that the invention may be used with any other type of accounting machine or similar business machine having any suitable means for selectively controlling electrically operated indicating means associated with the sorting device comprising a pluarality of sorting compartments.

The device herein illustrated is provided with a plurality of compartments to receive manually sorted record materials and is adapted for use in connection with, for example, a central control accounting machine of the type commonly used in bank clearing houses. A separate compartment is used for each bank associated with the clearing house, and all checks drawn on, or deposite slips credited to, each of said banks are manually placed in the appropriate compartments after the amounts and other data appearing thereon have been recorded by the accounting machine.

In order to reduce the possibility of the operator's filing such record material in the wrong compartment, the present invention provides an individual indicator for each compartment, which indicators are normally in a non-indicating position but which may be selectively moved from said non-indicating position into an indicating position to direct attention to their respective compartments, so that the operator will place the record material in only the selected one of the compartments. Classification keys on the accounting machine, which identify the different banks, are employed to selectively control electrical means for operating the indicators in such a manner that only the compartment corresponding to the particular bank involved in the last registration on the accounting machine is called to the attention of the operator, so that the record material relating to that particular registration will be filed in the proper compartment.

It is, therefore, an object of the invention to provide a sorting device of the character described having signalling means in the form of indicators which are selectively operable by remote control from an accounting machine or the like.

Another object of the invention is the provision of means which is compact, simple in construction, and economical to manufacture, for operating the sorting device indicators.

Another object of this invention is to provide a novel sorting box signal or indicator adapted to be magnetically operated and constructed so that the operating magnet does not have to overcome the inertia of the entire indicator instantly at the beginning of the indicator movement.

Another object of the invention is the provision of a structure of the class described in which noise incident to the operation thereof is minimized.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 1 is a perspective view of a portion of the sorting device, showing the particular stepped arrangement of the compartments and the indicators associated therewith.

Fig. 2 is a circuit diagram showing the connection between the keys and the solenoid for operating the indicators of the sorting device.

Fig. 3 is a detail composite side view, partly in section, of the sorting device, the indicators associated therewith, and means for selectively controlling the operation of said indicators.

Fig. 4 is an enlarged detail front view, in cross section, of one of the selecting keys and the electrical contact controlled thereby, for controlling the operation of the sorting device indicator.

Fig. 5 is a top plan view of one of the indicators, showing the solenoid for operating the same.

The invention disclosed herein employs a bank of classification keys incorporated in an accounting machine for selectively controlling the operation of the indicators for the sorting device compartments. These compartments form a unit which may be either attached to or separated from the accounting machine. While such classification keys are used to perform all the usual functions of such types of keys in the accounting machine—viz., release the machine for operation and control the selection of the totalizers and the adjustment of the printing and indicating mechanisms—they are also arranged herein so as to perform the added function of selectively controlling the operation of indicators on a sorting device in such a manner as to indicate to the operator the compartment into which he should file record material from which data has been entered into the accounting machine, said compartment of the sorting device corresponding to the classification key operated.

Control keys

The selecting means includes keys 61 (Figs. 2, 3, and 4), which may be control keys of the type commonly used in accounting machines and similar business machines. These keys are slidably mounted in the usual type of key frame 62, suitably supported in the machine, and therefore, only the details of the key construction which enter into this invention will be described herein. Since the construction and operation of each of the various keys 61, as well as the separate circuits and mechanism controlled by each of them, are substantially the same, it is felt that a description of one will suffice for all.

Each key 61 carries a laterally projecting pin 63, which is embraced by the usual guide member 64 secured to the key frame 62. Wound around the guide member 64 is a compression spring 65, which coacts with a roller 66 freely mounted on the pin 63 and normally operates to restore and retain the key 61 in its undepressed position. The roller 66 is made of insulating material and serves to hold open contacts 67 and 68 while the key 61 is in its normal undepressed position. Both of the contacts 67 and 68 are suitably insulated from their respective mountings. The contact 67 has a normal tendency to move downwardly to engage the contact 68, but is restrained from doing so by the undepressed key 61, above described. A contact bar 69, suitably mounted in the key frame 62, is connected to all of the contacts 67.

Sorting device

The sorting device herein illustrated (Fig. 1) comprises a housing or cabinet containing one or more rows of filing compartments located in stepped arrangement. These compartments are formed by side walls 85 and 86, with slanting partitions 87 and bottoms 88. The partitions 87 have slots 89 formed therein, whereby the operator may at any time remove sorted records or checks from the compartments. The stepped arrangement of the compartments facilitates the convenient filing of the record materials therein.

Each compartment is provided with a signalling member or indicator 90 (Figs. 1 and 5) to act as a signal to the operator to designate into which compartment said operator should file or place the check.

This indication is accomplished by the upper side of the indicator 90 being finished in the same color as the compartment, while the under side of the indicator is finished in a contrasting color to act as a signal to the operator. Upon operation of the indicator, the contrasting color of the under side thereof will be exposed to view, thereby indicating to the operator which compartment should receive the record material.

The indicator 90 (Figs. 3 and 5) is secured to a shaft 91 loosely mounted in a bracket 92 secured to the partition 87. Freely mounted on the shaft 91 is a bell crank 93, one arm of which is operatively connected to the indicator 90 by means of a torsion spring 94. The spring 94, being wound around the shaft 91, straddles one arm of the bell crank 93 and has both of its ends hooked onto the indicator 90. The purpose of this flexible connection between the bell crank 93 and the indicator 90 is threefold; namely, silencing the noise; avoiding vibration and rebound; and providing quicker and smoother action. With such an arrangement, the solenoid does not have to overcome the inertia of the indicator instantaneously at the beginning of the movement. Through such flexible connections, the bell crank 93 and the indicator 90 are adapted to move as a single unit. The arm of the bell crank 93 which coacts with the indicator 90 carries a rubber buffer 95, which extends beyond the upper and lower sides of such arm, as shown in Fig. 3. The lower portion of the rubber buffer is normally held in contact with the indicator 90 by the torsion spring 94, while the upper portion of the buffer is adapted to strike the bracket 92, when the bell crank 93 is rocked counter-clockwise (Fig. 3) to move the indicator 90 out of its normally ineffective or non-indicating position, as will be presently described. The other arm of the bell crank 93 is connected by a link 96 to an armature 97 of a solenoid 98 mounted on the partition 87 below the bottom 88. The partition 87 is suitably slotted to accommodate the left arm of the bell crank 93 and a portion of the link 96, so that there will be no interference between said parts and the record material deposited in the receiving compartment. For the same purpose, the lower portion of the link 96 and the solenoid 98 are located below the bottom 88 of the compartment, as above mentioned. A tension spring 99, fastened at one end to a stud 100 in the bracket 92 and at its other end to a stud 101 carried by the link 96, normally serves to hold the link 96 and the bell crank 93 in the position shown in Fig. 3, thereby maintaining the indicator 90 in its ineffective or non-indicating position, as here shown.

Upon energization of the solenoid 98, the armature 97 will be forced downwardly and, through the link 96, will rock the bell crank 93 counter-clockwise until the latter is stopped by the rubber buffer 95 thereon striking the bracket 92. The bell crank 93 will at this time, through the flexible connection formed by the torsion spring 94 between said bell crank 93 and the indicator 90, rock the indicator 90 counter-clockwise about the shaft 91 until it reaches a signalling or indicating position, whereupon its contrastingly colored under surface is exposed to the view of the operator, thus attracting the operator's attention to its respective compartment for the purpose of having record material deposited therein by the operator.

The indicator 90 remains in its effective or indicating position until the control key 61 is returned to its normal undepressed position, thereby deenergizing the solenoid 98, which occurs near the end of the operation of the accounting machine.

Upon deenergization of the solenoid 98, the spring 99 will move the link 96 upwardly to rock the bell crank 93 clockwise. Such clockwise movement of the bell crank 93 will likewise be transmitted to the indicator 90 to return the latter to its normal non-signalling or non-indicating position.

Upon such movement of the indicator 90 under influence of the spring 99, the link 96 is raised and the bell crank 93 is rocked clockwise (Fig. 3). To further lessen the noise of such parts, the bell crank 93 strikes a rubber buffer 102 carried by a lip 103 formed on the bracket 92.

A manually operable switch 111 (Fig. 2) is provided for controlling whether or not the sorting device indicators shall be operated from the accounting machine. If it is desired to operate the accounting machine without operating the sorting device indicators, it is only necessary to manually open the switch 111 and thereby break the line from the main power source of supply, so that depression of any of the transaction keys 61 will be inadequate to close the complete circuit for energizing the solenoid 98. However, when the switch 111 is closed, it will complete a circuit from the main supply line at point 112 through a line 113, line 114, through a pilot lamp 115, and line 116 back to the main supply line at point 117. The pilot lamp 115 is illuminated upon the closing of the circuit just mentioned to indicate to the operator that the sorting device indicating means has been conditioned for operation from the accounting machine.

The circuit through which depression of the transaction key 61 causes the energization of the solenoid 98 will now be described. Depression of any one of the keys 61 will cause engagement of its related pair of contacts 67 and 68 to close a circuit extending from the source of supply point 112 to line 113, switch 111, contacts 67 and 68, through a switchboard jack 118, line 119, solenoid 98, and line 116, back to the source of supply at point 117.

Switchboard jacks 118 are employed herein to permit ready changing of the circuit so that a key 61 may control the energization of a different solenoid, or even a plurality of solenoids, to operate a different indicator or indicators 90.

The classification key 61 employed in the present invention serves to release the accounting machine for operation, thus causing the indication or signal of the selected compartment in the associated sorting device to remain in signalling position only during the operation of such accounting machine. Other keys in the accounting machine may be used for the same purpose without departing from the spirit of the invention.

It will thus be seen that, upon operation of any key 61 to control certain functions of the accounting machine, a corresponding control is simultaneously exercised thereby over the operation of the indicating means for the compartments of the sorting device used in conjunction with said accounting machine.

Since the operation of the present invention has been thoroughly discussed in connection with the description of the construction and operation of the various elements involved therein, it is not thought necessary to give a résumé of the operation thereof.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. An indicating mechanism for a sorting device having a filing compartment adapted to receive record material, consisting of the combination of indicating means freely mounted in said compartment and normally in a non-indicating position; a solenoid mounted externally of the compartment; an armature in said solenoid; a link connected to said armature to be actuated thereby; a flexible connection between the link and the freely mounted indicator, whereby the indicator is flexibly operated upon operation of the link; means for energizing said solenoid to move the armature and, through said link and flexible connection, move said indicating means into an indicating position to attract attention to said compartment; and a spring to restore the indicator into its non-indicating position upon deenergizing the solenoid.

2. An indicating mechanism for a sorting device having a filing compartment adapted to receive manually sorted record material, consisting of the combination of a manipulative device; indicating means freely mounted in said compartment but normally in a non-indicating position; a solenoid mounted on the exterior of the compartment; an armature in said solenoid; a link connected to said armature to be actuated thereby; a flexible connection between the link and the freely mounted indicator, whereby the indicator is flexibly operated upon operation of the link; and means under control of said manipulative device for energizing said solenoid to move said armature and, through said link and flexible connection, actuate said indicating means to indicate to the operator that the record material should be filed in that compartment.

3. An indicating mechanism for a sorting device having a filing compartment adapted to have record material manually deposited therein, consisting of the combination of a freely mounted indicator in said compartment and normally in a non-indicating position; a solenoid mounted outside of the compartment; an armature in said solenoid; a pivoted member; flexible means connecting the member to said indicator; a link connecting said armature with said member; and means for energizing said solenoid to move the armature and, through the link, actuate said member and flexible means to set the indicator to signal to the operator that the record material should be deposited in that compartment.

4. An indicating mechanism for a sorting device having a filing compartment for receiving record material, consisting of the combination of a manipulative device; an indicator for said compartment and having one side colored the same as the compartment and another side of a contrasting color; a solenoid; an armature in said solenoid; a pivoted member; resilient means for operatively connecting the member with the indicator; a link connecting said armature with said member; a spring normally coacting with said link to maintain the armature, the member, and the indicator in such positions as to normally retain the indicator with said one colored side exposed to view; and means under control of said manipulative device for energizing the solenoid to move the armature and the link, against the action of said spring, to actuate said member and indicator to expose the side of contrasting color to view to attract the attention of the operator to the compartment.

5. An indicating mechanism for a sorting device having a filing compartment for receiving record material, consisting of the combination of indicating means for said compartment and normally in an ineffective position; a bracket secured to one wall of said compartment; a shaft suitably journaled in said bracket and having secured thereon said indicating means; a member freely mounted on said shaft; a torsion spring surrounding said shaft and serving to connect said member with said indicating means; a solenoid; an armature in said solenoid; a link connecting said armature with said member; and means for energizing said solenoid to move the armature and, through the link, actuate said member and indicating means.

6. An indicating mechanism for a sorting device having a filing compartment for receiving record material, consisting of the combination of a pivoted indicator for said compartment and normally in an ineffective position; a bracket secured to said compartment; a shaft journaled in the bracket and having said indicator secured thereto; a member pivoted on the shaft; a solenoid adapted, when energized, to rock said pivoted member; resilient means adapted to be placed under tension upon energization of the solenoid and also adapted to restore said member to normal position upon deenergization of said solenoid; a second resilient means intermediate said indicator and said pivoted member and adapted to move the indicator into effective position when the pivoted member is rocked by the solenoid, said indicator being restored to normal position by said pivoted member when it is restored by the first-mentioned resilient means; cushioning means carried by said bracket to act as a stop for said pivoted member when the latter is returned to its normal position and also absorb the shock and noise attendant upon the restoration of said pivoted member; a cushioning device carried by said pivoted member and projecting from both sides thereof, one portion of said cushioning device adapted to normally separate the indicator from the pivoted member to absorb the shock and noise incident to an operation of the pivoted member and indicator, another portion of said cushioning device acting to absorb the shock and noise attendant upon the operation of the pivoted member and indicator as the latter completes its movement into its effective position; and manipulative means for causing energization and de-energization of said solenoid.

7. Signalling mechanism for a filing compartment associated with an accounting machine and adapted to receive record material which has been manually sorted, consisting of the combination of a signalling means for the compartment but normally in an ineffective position; a solenoid for the signalling means; an armature in the solenoid; a pivoted member for the signalling means; resilient means for operatively connecting said member with the signalling means; a link connecting the armature with the associated member; and means for energizing the solenoid to move the armature and link to actuate the member and signalling means to indicate to the operator that the record material should be filed in said compartment.

8. Signalling mechanism for a filing compartment associated with an accounting machine and adapted to receive manually sorted record material, consisting of an accounting machine manipulative device; signalling means for the compartment and having the upper side thereof colored like said compartment and the lower side thereof of a contrasting color; actuating means for the signalling means; a pivoted member for the signalling means; resilient means for operatively connecting said member with said signalling means; a link intermediate the actuating means and the member; and means under control of said manipulative device for operating said actuating means to move the link and member to actuate the signalling means to expose the lower contrastingly colored side thereof to indicate to the operator that the record material should be filed in said compartment.

9. An indicating mechanism for a sorting device associated with an accounting machine having manipulative control devices for controlling certain functions of the accounting machine, and filing compartments in said sorting device adapted to receive manually sorted record material, each compartment having an indicating mechanism associated therewith consisting of an indicator having one side colored like the compartment and another side coated with a contrasting color; a bracket secured within said compartment; a shaft suitably journaled in the bracket and having secured thereon said indicator; a member freely mounted on the shaft; a torsion spring forming a resilient operating connection between said member and said indicator; a solenoid for the compartment; an armature in said solenoid; a link intermediate the armature and member; a spring for said link and normally coacting with said link to maintain the armature, member, and indicator in such position as to retain that side of the indicator visible which is of the same color as its compartment; and means under control of a manipulative device for energizing the solenoid to move the corresponding armature and link, against the action of the last-named spring, to actuate said member and indicator to shift the indicator to bring its contrastingly colored side into visible position to signal to the operator that the record material should be filed in said compartment.

PASCAL SPURLINO.
KONRAD RAUCH.

REFERENCES CITED

The following references are of record in the file of this patent:

UNITED STATES PATENTS

| Number | Name | Date |
|---|---|---|
| 847,479 | Jackson | Mar. 19, 1907 |
| 1,976,600 | Carroll | Oct. 9, 1934 |
| 735,953 | Dean | Aug. 11, 1903 |
| 1,405,812 | Wood | Feb. 7, 1922 |
| 1,246,358 | Trew | Nov. 13, 1917 |
| 1,375,241 | Trew | Apr. 19, 1921 |
| 1,847,533 | Lasker | Mar. 1, 1932 |
| 384,088 | Scribner | June 5, 1888 |
| 488,536 | Bates | Dec. 27, 1892 |
| 1,275,114 | Werntz | Aug. 6, 1918 |
| 1,457,473 | Tiner | June 5, 1923 |
| 2,087,576 | Miller | July 20, 1937 |